United States Patent [19]

Akatsuka et al.

[11] Patent Number: 5,437,450
[45] Date of Patent: Aug. 1, 1995

[54] GOLF CLUB SHAFT AND PROCESS OF PREPARING SAME

[75] Inventors: Tsuneo Akatsuka, Saitama; Yoshihiro Motoki, Misato; Takashi Harada, Soka; Akira Suzawa, Koshigaya, all of Japan

[73] Assignee: Somar Corporation, Japan

[21] Appl. No.: 297,028

[22] Filed: Aug. 29, 1994

[30] Foreign Application Priority Data

Aug. 31, 1993 [JP] Japan .................. 5-238964

[51] Int. Cl.6 .............................................. A63B 53/10
[52] U.S. Cl. .......................... 273/80 B; 273/DIG. 23; 428/36.3; 428/36.9
[58] Field of Search .............. 273/80 R, 80 B, DIG. 7, 273/DIG. 23, 77 R, 73 F; 428/36.1, 36.3, 36.9, 257, 246, 377; 156/173, 189, 190, 188

[56] References Cited

U.S. PATENT DOCUMENTS

| | | | |
|---|---|---|---|
| 3,313,541 | 4/1967 | Benkoczy | 273/80 R |
| 3,998,458 | 12/1976 | Inoue | 273/80 R |
| 4,023,801 | 5/1977 | Van Auken | 273/80 B |
| 4,135,035 | 1/1979 | Branen | 273/80 R |
| 4,757,997 | 7/1988 | Roy | 273/80 R |
| 5,088,735 | 2/1992 | Shigetoh | 273/80 B |
| 5,143,374 | 9/1992 | Shibasaki | 273/80 B |
| 5,156,396 | 10/1992 | Akatsuka | 273/80 B |

*Primary Examiner*—Sebastiano Passaniti
*Attorney, Agent, or Firm*—Lorusso & Loud

[57] ABSTRACT

A light weight golf club shaft is disclosed which has an average weight of not greater than 1.4 g per inch and which is composed of an inner tubular layer of a carbon fiber reinforced plastic having a fiber orientation angle of 40 to 50 degrees with respect to the longitudinal axis of the shaft and an outer tubular layer of a carbon fiber reinforced plastic provided around the inner layer and having a fiber orientation angle of 5 to 30 degrees. The inner layer is obtained from a prepreg sheet by a sheet winding method, while the outer layer is obtained from a roving carbon fibers by a filament winding method. The inner layer has been hardened before the winding of the roving. A reinforcing layer obtained from a prepreg and having a fiber orientation angle of 0 to 5 degrees is provided inside of the inner layer at the tip portion of the shaft.

2 Claims, 1 Drawing Sheet

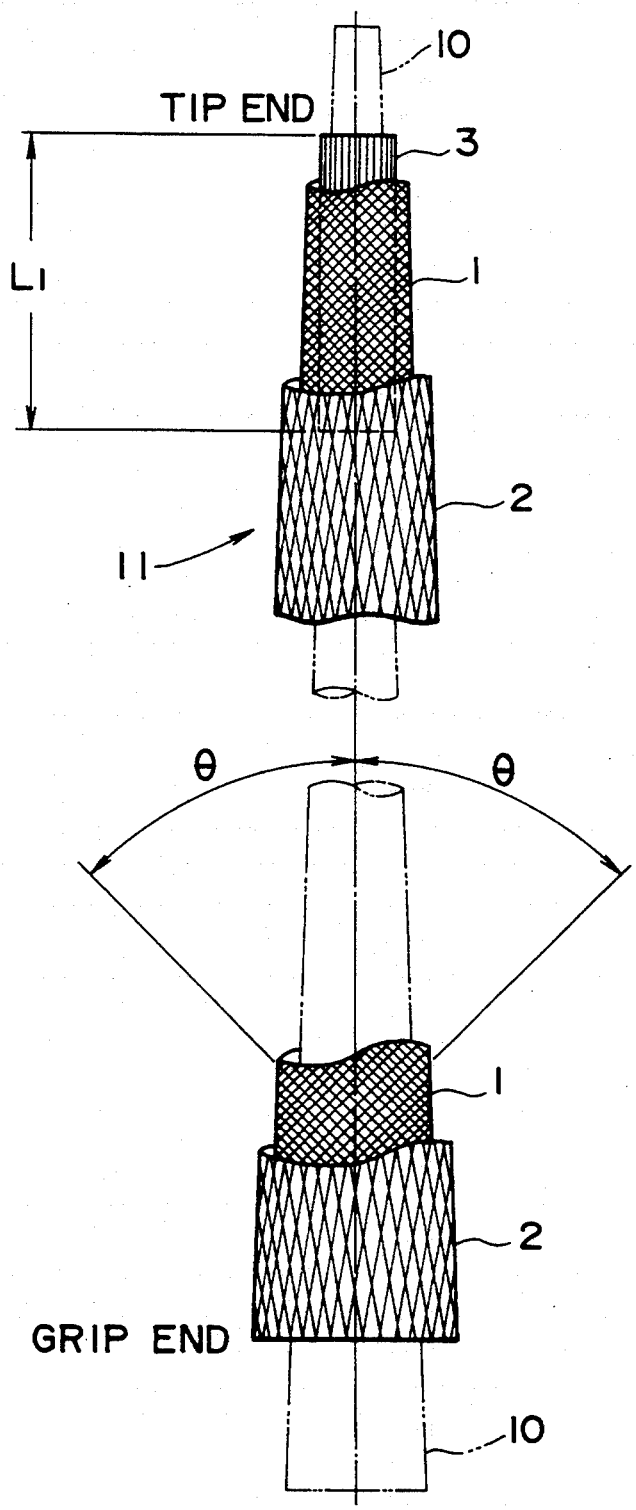

GOLF CLUB SHAFT AND PROCESS OF PREPARING SAME

BACKGROUND OF THE INVENTION

This invention relates to a golf club shaft formed of a carbon fiber-reinforced plastic and to a process for the fabrication thereof.

Carbon fiber-reinforced plastic (CFRP) shafts are now increasingly used because they are lighter in weight and provide golf clubs which can hit a golf ball longer distance as compared with conventional steel club shafts. In general, CFRP shafts are produced by a sheet winding method in which a prepreg sheet containing carbon fibers dispersed in a matrix of a hardenable resin is wound around a mandrel or by a filament winding method in which a tow or roving of carbon fibers impregnated with a hardenable resin is wound around a mandrel.

A CFRP shaft produced by the sheet winding method shows satisfactory mechanical strengths but encounters a problem because the flexural rigidity varies at different positions around the circumference. Thus, even with the same shaft and the same club head, the resulting golf club assembly gives a player a swing feeling that varies with the relative position therebetween. This follows that it is necessary to assemble the head and the shaft with a specific relative position.

While a CFRP shaft fabricated by the filament winding method is free from the above problem, the mechanical strengths thereof are insufficient to support a relatively large club head made of a metal. The recent trend is toward the use of a golf club having a light CFRP shaft and a large metal head. Thus, a CFRP shaft obtained by the filament winding method fails to meet with the recent demand.

There are proposals to prepare CFRP shafts by a combination of the filament winding and sheet winding methods. JP-A-57-142271 discloses a process for the production of a CFRP shaft having an improved strength and torsional rigidity, which includes the steps of winding a prepreg sheet containing carbon fibers dispersed in a matrix of a hardenable resin around a mandrel to form an inner layer, then winding a roving of carbon fibers impregnated with a hardenable resin around the inner layer to form an outer layer, and then hardening the inner and outer layers together.

JP-A-2-111380 discloses a process for the preparation of a golf club shaft having a tip end and a grip end, which includes the steps of winding a prepreg sheet containing carbon fibers dispersed in a matrix of a hardenable resin around a mandrel to form an inner layer extending from the grip end and terminating at least 100 mm away from the tip end, then winding a roving of carbon fibers impregnated with a hardenable resin around the inner layer to form an intermediate layer extending from the grip end to the tip end, then winding a roving of glass fibers impregnated with a hardenable resin around the intermediate layer throughout the length thereof to form an outer layer, and then hardening the inner, intermediate and outer layer together.

These publications are silent with respect to the reduction of the weight of the shaft to 1.4 g/in or less and the minimization of variation of flexural rigidity around circumference. It has also been found that the shafts obtained by the above processes still lack the mechanical strengths required for use with a large metal club head.

SUMMARY OF THE INVENTION

It is an object of the present invention to provide a CFRP golf club shaft which has an average weight of as light as 1.4 g per inch or less but which exhibits high mechanical strengths suitable for use with a large metal head.

Another object of the present invention is to provide a golf club shaft of the above-mentioned type which shows uniform deflection characteristics around the circumference and which can be produced economically with good producibility.

In accomplishing the foregoing objects, the present invention provides a golf club shaft having a grip end, a tip end, an outer diameter gradually decreasing from the grip end to the tip end, and an average weight of not greater than 1.4 g per inch. The shaft includes:

an inner tubular layer formed of a hardened, first carbon fiber-reinforced plastic and extending continuously throughout the length of the shaft, the inner layer containing a first carbon fiber group having a modulus of 29,000 kgf/mm$^2$ or more and a tensile strength of 300 kgf/mm$^2$ or more and oriented at an angle in the range of 40 to 50 degrees with respect to the longitudinal axis of the shaft;

an outer tubular layer provided contiguously around the inner layer throughout the length thereof and formed of a hardened, second carbon fiber-reinforced plastic material, the outer layer containing a second carbon fiber group having a modulus of 24,000 kgf/mm$^2$ or more and a tensile strength of 450 kgf/mm$^2$ or more and oriented at an angle in the range of 5 to 30 degrees with respect to the longitudinal axis of the shaft, and a tubular, reinforcing layer provided inside of the inner layer and extending from the tip end with a length of 50 to 500 mm, the reinforcing layer being formed of a hardened, reinforcing fiber-reinforced plastic containing a fiber group having a modulus of 20,000 kgf/mm$^2$ or more and a tensile strength of 500 kgf/mm$^2$ or more and oriented at an angle in the range of 0 to 5 degrees with respect to the longitudinal axis of the shaft, the weight ratio of the inner layer to the outer layer being in the range of 20:80 to 55:45, the thickness ratio of the inner layer to the outer layer being in the range of 1:3 to 1:1, the inner layer being obtained from a prepreg sheet containing the first carbon fiber group uniaxially oriented within a matrix of a first hardenable resin, the reinforcing layer being obtained from a prepreg sheet containing the reinforcing fiber group uniaxially oriented within a matrix of a second hardenable resin, the outer layer being obtained from windings of a roving of the second carbon fiber groups impregnated with a third hardenable resin, the first and second hardenable resins having been hardened before the winding of the roving.

In another aspect, the present invention provides a process for the preparation of a golf club shaft, which includes the steps of:

providing an axially elongated mandrel having an outer diameter gradually increasing from one end thereof to the other end thereof;

winding at least one sheet of a first prepreg, containing uniaxially oriented reinforcing fibers each having a modulus of 20,000 kgf/mm$^2$ and a tensile strength of 500 kgf/mm$^2$ or more and dispersed within a matrix of a first hardenable resin, around the mandrel to form a first wound layer axially extending from a first portion of the mandrel adjacent to the one end to a second portion of the mandrel 50–500 mm away from the first portion with the reinforcing fibers being oriented at an angle in the range of 0 to 5 degrees with respect to the axis of the mandrel;

winding at least one sheet of a second prepreg, containing uniaxially oriented first carbon fibers each having a modulus of 29,000 kgf/mm$^2$ or more and a tensile strength of 300 kgf/mm$^2$ or more and dispersed within a matrix of a second hardenable resin, around the mandrel to form a second wound layer axially extending from the first portion of the mandrel to a third portion of the mandrel adjacent to the other end thereof with the first carbon fibers being oriented at an angle in the range of 40 to 50 degrees with respect to the axis of the mandrel;

then hardening the first and second wound layers so that a reinforcing layer of the hardened first resin reinforced with the reinforcing fibers and an inner layer of the hardened second resin reinforced with the first carbon fibers are formed around the mandrel;

then winding a roving of second carbon fibers each having a modulus of 24,000 kgf/mm$^2$ and a tensile strength of 450 kgf/mm$^2$ or more and impregnated with a third hardenable resin around the inner layer to form a third wound layer extending to entirely cover the inner layer with the second carbon fibers being oriented at an angle in the range of 5 to 30 degrees with respect to the axis of the mandrel;

then hardening the third wound layer to form an outer layer of the hardened third resin reinforced with the second carbon fibers and to thereby form an integral assembly composed of the reinforcing layer, the inner layer and the outer layer; and removing the mandrel from the assembly.

BRIEF DESCRIPTION OF THE DRAWINGS

Other objects, features and advantages of the present invention will become apparent from the detailed description of the preferred embodiments of the invention which follows, when considered in light of the accompanying drawings, in which:

the sole FIGURE is an elevational view, cut away in part, showing the construction and fiber orientation of the layers, in the tip end and grip end portions, of a golf club shaft according to the present invention.

DETAILED DESCRIPTION OF THE PREFERRED EMBODIMENTS OF THE INVENTION

Referring to the FIGURE, designated generally as 11 is a golf club shaft according to one embodiment of the present invention. The shaft 11 in this embodiment is illustrated as being wound on a mandrel 10 having an outer diameter gradually increasing from one end adjacent to a tip end of the shaft 10 to the other end adjacent to a grip end of the shaft 10.

The shaft 11 has an inner tubular layer 1 formed of a hardened, first carbon fiber-reinforced plastic and extending continuously between the tip end and the grip end thereof. The inner layer 1 contains a first carbon fiber group oriented at an angle $\theta$ in the range of 40 to 50 degrees with respect to the longitudinal axis of the shaft 11. Preferably, the inner layer 1 is formed of two kinds of wound layers each of which has the same filament orientation angle but which have filament orientation directions opposite to each other with respect to the longitudinal axis of the shaft as shown in the FIGURE. In the present specification and claims, the orientation angle of the fibers (e.g. $\theta$ of the first carbon fibers of the inner layer) is indicated in terms of an absolute value, so that, for example, $\theta$ of 45° indicates either of the positive and negative positions ($\pm 45°$) relative to the axis of the shaft.

The first carbon fiber from which the inner layer 1 is formed is a high modulus carbon fiber having a modulus of 29,000 kgf/mm$^2$ or more, preferably 40,000 kgf/mm$^2$ or more and a tensile strength of 300 kgf/mm$^2$ or more, preferably 350 kgf/mm$^2$ or more. The elongation of the first carbon fiber is generally 0.5–1.8%, preferably 0.5–1.0%. Illustrative of suitable high modulus carbon fibers are those commercially available under the trade names of T800, M30S, M40J, M46J, M50J, M55J, M60J and M65J (products by Toray Kabushiki Kaisha) and HMS-40, HMS-46, HMS-55 and HMS-63 (products of Tohoh Rayon Kabushiki Kaisha) and IM-400, IM-600, UM-40, UM-46, UM-55, UM-63 and UM-68 (products of Tohoh Rayon Kabushiki Kaisha).

The inner layer 1 generally has a carbon fiber content of 65–80% by weight, preferably 70–76% by weight. In terms of volumetric percentage, the carbon fiber content is generally 55–75% by volume, preferably 60–70% by volume. The plastic material used as a binder or matrix resin for the first carbon fiber is generally a thermosetting resin such as an epoxy resin or an unsaturated polyester resin. An epoxy resin is preferably used. The inner layer 1 is formed by a sheet winding method using a prepreg containing the first carbon fibers uniaxially oriented within a matrix of a hardenable resin composition.

Provided around the inner layer 1 is an outer tubular layer 2 extending throughout the length the shaft 11 and formed of a hardened, second carbon fiber-reinforced plastic. The outer layer 2 contains a second carbon fiber group oriented at an angle in the range of 5 to 30 degrees with respect to the longitudinal axis of the shaft 11. Preferably, the outer layer 2 is formed of a plurality of wound layers arranged such that the orientation angle the carbon fiber groups of respective layers relative to the longitudinal axis of the shaft is the same but the orientation directions of the fiber groups of each adjacent two layers are opposite to each other with respect to the longitudinal axis of the shaft as shown in the FIGURE.

The second carbon fiber from which the outer layer 2 is formed is a high modulus and high strength carbon fiber having a modulus of 24,000 kgf/mm$^2$ or more, preferably 30,000 kgf/mm$^2$ or more, and a tensile strength of 450 kgf/mm$^2$ or more, preferably 550 kgf/mm$^2$ or more. The elongation of the second carbon fiber is generally 0.8–2.1%, preferably 1.0–2.1%. Illustrative of suitable high modulus carbon fibers are those commercially available under the trade names of T700S, T800, M30S, M35J, M40J and M46J (products by Toray Kabushiki Kaisha) and HMS-40, HMS-46, HMS-55 and HMS-63 (products of Tohoh Rayon Kabushiki Kaisha) and UT-500, IM-400, IM-600, UM-40 and UM-46 (products of Tohoh Rayon Kabushiki Kaisha).

The outer layer 2 generally has a carbon fiber content of 65–80% by weight, preferably 67–75% by weight. In terms of volumetric percentage, the carbon fiber content is generally 55–70% by volume, preferably 58–67% by volume. The plastic material used as a binder or matrix resin for the second carbon fiber is generally a thermosetting resin such as an epoxy resin or an unsaturated polyester resin. An epoxy resin is preferably used. The outer layer 2 is formed by a filament winding method using a tow or roving of the second carbon fibers impregnated with a hardenable resin composition.

Designated as 3 is a tubular reinforcing layer provided inside of the inner layer 1 and extending from the tip end of the shaft through a length $L_1$ of 50 to 500 mm, preferably 100–300 mm. The reinforcing layer 3 is formed of a fiber-reinforced plastic containing reinforcing fiber group oriented at an angle in the range of 0 to 5 degrees with respect to the longitudinal axis of the shaft 11. The reinforcing layer 3 serves to improve the bending modulus and impact resistance of the shaft 11.

The fiber from which the reinforcing layer 3 is formed is a high strength fiber such as a carbon fiber, a boron fiber, titanium fiber, an aromatic polyamide fiber or a polyethylene fiber. These fibers may be used by themselves or as a mixture or in combination of two or more. A carbon fiber is preferably used. The reinforcing fiber has a modulus of 20,000 kgf/mm$^2$ or more, preferably 23,000 kgf/mm$^2$ or more, and a tensile strength of 400 kgf/mm$^2$ or more, preferably 500 kgf/mm$^2$ or more. The elongation of the reinforcing fiber is generally 1.5–2.1%, preferably 1.8–2.1%.

The reinforcing layer 3 generally has a fiber content of 65–76% by weight, preferably 67–70% by weight. In terms of volumetric percentage, the carbon fiber content is generally 55–70% by volume, preferably 58–62% by volume. The plastic material used as a binder or matrix resin for the reinforcing fiber is generally a thermosetting resin such as an epoxy resin or an unsaturated polyester resin. An epoxy resin is preferably used. The reinforcing layer 3 is formed by a sheet winding method using a prepreg containing the reinforcing fibers uniaxially oriented within a matrix of a hardenable resin composition.

The weight ratio of the inner layer 1 to the outer layer 3 should be in the range of 20:80 to 55:45, preferably 30:70 to 45:55. The thickness ratio of the inner layer 1 to the outer layer 3 should be in the range of 1:3 to 1:1, preferably 2:5 to 2:3. A weight ratio in excess of 55:45 or a thickness ratio in excess of 1:1 is undesirable because the weight of the shaft increases and the uniformity of the bending modulus (flexural rigidity) of the shaft in the circumferential direction is lost. When the weight ratio is smaller than 20:80 or when the thickness ratio is smaller than 1:3, on the other hand, the torsional rigidity, bending modulus and buckling strength of the shaft are lowered.

The proportion of the reinforcing layer 3 in the shaft 11 is generally 5–25% by weight, preferably 10–25% by weight. In other words, the total weight of the inner layer 1 and the outer layer 2 is generally 75–95% by weight, preferably 75–90% by weight, based on the weight of the shaft 11. The total carbon fiber content of the shaft 11 is generally 65–75% by volume, preferably 65–70% by volume.

The length of the shaft of the present invention is generally 41–46 inches. The tip end of the shaft has an inside diameter of 2–6 mm, preferably 3–4 mm and a wall thickness of 1.2–3.2 mm, preferably 1.7–2.7 mm, while the grip end has an inside diameter of 11.5–14.5 mm, preferably 12.5–13.5 mm and a wall thickness of 0.5–2.0 mm, preferably 0.7–1.5 mm.

The golf club shaft 11 according to the present invention may be produced by the following method.

First, a prepreg sheet (first prepreg) containing uniaxially oriented reinforcing fibers is cut from a stock material for the reinforcing layer 3 to the desired pattern and is wound around an axially elongated mandrel 10 having an outer diameter gradually increasing from one end thereof to the other end thereof. The prepreg is cut so that the wound prepreg has an axial length of about 50–500 mm and the reinforcing fibers are oriented at an angle in the range of 0 to 5 degrees with respect to the axis of the mandrel 10. The size is determined by the number of convolutions of the material that is to be wound around the mandrel 10. The number of convolutions is determined by the weight and the thickness of the reinforcing layer 3 of the ultimate shaft 11.

Next, at least one sheet of a second prepreg containing uniaxially oriented first carbon fibers is wound around the mandrel for the formation of the inner layer 1. Thus, a prepreg sheet is cut from a stock material for the inner layer 3 to the desired pattern and is wound the mandrel 10. The prepreg is cut so that the wound prepreg has an axial length generally slightly greater than that of the ultimate shaft 11 and the first carbon fibers are oriented, when wound around the mandrel 10, at an angle in the range of 40 to 50 degrees with respect to the axis thereof. The size is determined by the number of convolutions of the material that is to be wound around the mandrel 10.

As described previously, it is preferred that the inner layer 1 be formed of two different kinds of wound layers. In this case, two, first and second kinds of prepreg sheets having, for example, ±45° filament orientations are used. In winding, the first and second prepregs may be alternately wound each through one complete convolution until the desired thickness is reached. Alternatively, the first prepreg (+45°) may be wound through a desired number of convolutions, with the second prepreg (−45°) being subsequently wound through the same number of convolutions.

The thus formed first and second wound layers (which are precursors of the reinforcing layer 3 and the inner layer 1, respectively) are then hardened so that the reinforcing layer 3 of the hardened first resin reinforced with the reinforcing fibers and the inner layer 1 of the hardened second resin reinforced with the first carbon fibers are formed around the mandrel 10. The hardening is generally performed by heating at a temperature of 120°–150° C. for 2–4 hours. Prior to heating, it is preferred that the wound prepreg layers be held in position around the mandrel 10 by winding a tape, formed of, for example, a polypropylene, polyester or poly(vinyl fluoride) film, in the conventional manner.

Then, a roving or tow of second carbon fibers impregnated with a hardenable resin is wound by a filament winding method around the hardened inner layer 1 supported by the mandrel 10 to form a third wound layer (a precursor of the outer layer 2) extending to entirely cover the inner layer 1 with the second carbon fibers being oriented at an angle in the range of 5 to 30 degrees with respect to the axis of the mandrel. Preferably, the roving is wound from one end to the other end with an orientation angle in the range of +5° to +30° and then from the other end to the one end at an orientation angle in the range of −5° to −30°. Such reciprocal winding operation is continued until the wound layer has the desired thickness. It is important that the hardening of the reinforcing layer 3 and the inner layer 1 should be performed before the formation of the outer layer 2 since otherwise the fibers of the reinforcing layer 3 and the inner layer 2 would be partially loosened so that the orientation thereof would be disordered and voids would be formed within the inner and reinforcing layers. This follows that the mechanical strengths as well as the uniformity in bending characteristics around the circumference of the ultimate shaft are adversely affected.

The third wound layer thus formed is then hardened in the same manner as the first and second wound layers to form an outer layer of the hardened third resin reinforced with the second carbon fibers. Then, the mandrel 10 is removed to leave a shaft composed of the reinforcing layer 3, the inner layer 1 and the outer layer 2. The both ends of the shaft are cut to adjust the length thereof to a predetermined value and the outer surface of the shaft is ground to a predetermined diameter, thereby to obtain the ultimate shaft 11.

The following examples will further illustrate the present invention.

EXAMPLE 1

A stainless steel mandrel having a length of 1143 mm and diameters at the smaller diameter and larger diameter ends of 4.0 mm and 13.0 mm, respectively, was coated with a silicone lubricant. A prepreg sheet containing uniaxially aligned carbon fiber filaments impregnated with an epoxy resin composition was then wound on the smaller diameter end portion of the mandrel with the direction of the carbon fiber filament being oriented in substantially parallel with the longitudinal axis of the mandrel (namely, the carbon fibers are oriented at an angle of about 0 degree with respect to the axis of the mandrel) to form a wound reinforcing layer having a length of 250 mm (from the tip end of the shaft). The prepreg sheet used was a commercially available one (P3052S-15 manufactured by Toray Kabushiki Kaisha) having a thickness of 0.15 mm, a carbon fiber weight of 150 g/m$^2$, a resin content of 33% by weight (fiber content: 67% by weight) and a carbon fiber content of 58% by volume. The carbon fiber of the prepreg sheet had a modulus of 23,500 kgf/mm$^2$, a tensile strength of 490 kgf/mm$^2$ and an elongation of 2.1%. The prepreg was wound around the mandrel so that the number of the convolutions was 1 (1 ply) at the larger diameter end (250 mm away from the tip end) and was 3.8 (3.8 plies) at the smaller diameter end.

Two kinds of prepreg sheets A-1 and A-2 were cut from a prepreg stock (P9055F-08 manufactured by Toray Kabushiki Kaisha) which contained uniaxially aligned carbon fiber filaments impregnated with an epoxy resin composition and which had a thickness of 0.06 mm, a carbon fiber weight of 75 g/m$^2$, a resin content of 24% by weight (fiber content: 76% by weight) and a carbon fiber content of 69% by volume. The carbon fiber of the prepreg stock had a modulus of 38,500 kgf/mm$^2$, a tensile strength of 450 kgf/mm$^2$ and an elongation of 1.0%. The prepreg sheets A-1 and A-2 had the same size but the orientation direction of the carbon fibers were opposite to each other. The prepreg sheet A-1 was wound around the mandrel throughout the length thereof with the direction of the carbon fiber filament being oriented at an angle of +45 degrees with respect to the axis of the mandrel and with the number of the convolutions being 2 (2 plies) at the larger diameter end and 3 (3 plies) at the smaller diameter end. Then the prepreg sheet A-2 was wound around the wound A-1 sheet throughout the length thereof with the direction of the carbon fiber filament being oriented at an angle of −45 degrees with respect to the axis of the mandrel and with the number of the convolutions being 2 (2 plies) at the larger diameter end and 3 (3 plies) at the smaller diameter end, thereby to form a wound inner layer.

A polypropylene film tape was then wound around the inner layer and the resulting assembly was heated at 130° C. for 2 hours to completely cure the reinforcing layer and the inner layer. The polypropylene tape was then removed.

A tow of carbon fibers (IM-600-12K manufactured by Tohoh Rayon Kabushiki Kaisha, filament number: 12,000, filament diameter: 5 μm) was impregnated with a hardenable epoxy resin composition and then wound around the hardened inner layer at a winding angle of +10° from the smaller diameter end to the larger diameter end and at a winding angle of −10° from the larger diameter end to the smaller diameter end. Such reciprocal winding was continued until the outer diameters of the resulting outer layer at the smaller and larger diameter ends became slightly larger than 8.5 mm and 15 mm, respectively. The tow used had a resin content of 30% by weight (fiber content: 70% by weight) and a carbon fiber content of 61% by volume. The carbon fiber of the tow had a modulus of 29,000 kgf/mm$^2$, a tensile strength of 590 kgf/mm$^2$ and an elongation of 2.0%.

A polypropylene film tape was then wound around the outer layer and the resulting assembly was heated at 130° C. for 2 hours to completely cure the outer layer. After being cooled to room temperature, the mandrel was removed and the polypropylene tape was removed. The resulting shaft was sanded to form a golf club shaft having a length of 1143 mm (45 inches), a tip end outside diameter of 8.5 mm and a grip end outside diameter of 15 mm, a weight of 57 g, a weight ratio of the inner layer to the outer layer of 37:63, a thickness ratio of the inner layer to the outer layer of 10:17, a weight of the reinforcing layer of 6% by weight based on the total weight of the shaft and a total fiber content of 65% by volume.

COMPARATIVE EXAMPLE 1

Example 1 was repeated in the same manner as described except that the outer layer was formed by a sheet winding method in place of the filament winding method. Thus, a prepreg sheet containing uniaxially aligned carbon fiber filaments impregnated with an epoxy resin composition was wound around the hardened inner layer throughout the length thereof with the direction of the carbon fiber filament being oriented in substantially parallel with the longitudinal axis of the mandrel (namely, the carbon fibers are oriented at an angle of about 0 degree with respect to the axis of the mandrel) to form a wound outer layer. The prepreg sheet used was a commercially available one (P3052S-17 manufactured by Yoray Kabushiki Kaisha) having a thickness of 0.17 mm, a carbon fiber weight of 175 g/m$^2$ resin content of 33% by weight (fiber content: 67% by weight) and a carbon fiber content of 59% by volume. The carbon fiber of the prepreg sheet had a modulus of 30,000 kgf/mm$^2$, a tensile strength of 560 kgf/mm$^2$ and an elongation of 1.8%. The prepreg was wound around the mandrel so that the number of the convolutions was 3 throughout the length thereof. The resulting golf club shaft had a weight of 56 g, a weight ratio of the inner layer to the outer layer of 37:63, a thickness ratio of the inner layer to the outer layer of 10:17, a weight of the reinforcing layer of 6% by weight based on the total weight of the shaft and a total fiber content of 64% by volume.

COMPARATIVE EXAMPLE 2

Example 1 was repeated in the same manner as described except that the inner layer was formed by a filament winding method in place of the sheet winding method. Thus, a tow of carbon fibers (UM40-12K manufactured by Tohoh Rayon Kabushiki Kaisha) was impregnated with a hardenable epoxy resin composition and then wound around the hardened inner layer at a winding angle of +45° from the smaller diameter end to the larger diameter end and at a winding angle of −45° from the larger diameter end to the smaller diameter end. Such reciprocal winding was continued until the outer diameters of the resulting outer layer at the smaller and larger diameter ends became 4.8 mm and 13.3 mm, respectively. The tow used had a resin content of 24% by weight (fiber content: 76% by weight) and a carbon fiber content of 69% by volume. The carbon fiber of the tow had a modulus of 39,000 kgf/mm$^2$, a tensile strength of 500 kgf/mm$^2$ and an elongation of 1.2%. The resulting golf club shaft had a weight of 57 g, a weight ratio of the inner layer to the outer layer of 37:63, a thickness ratio of the inner layer to the outer layer of 10:17, a weight of the reinforcing layer of 6% by weight based on the total weight of the shaft and a total fiber content of 65% by volume.

COMPARATIVE EXAMPLE 3

Example 1 was repeated in the same manner as described except that the wound reinforcing layer and the inner layer were not cured before the winding of the outer layer. Thus, the hardening of the reinforcing layer, inner layer and outer layer was simultaneously performed after the winding of the outer layer. The resulting golf club shaft had a weight of 56 g, a weight ratio of the inner layer to the outer layer of 37:63, a thickness ratio of the inner layer to the outer layer of 10:17, a weight of the reinforcing layer of 6% by weight based on the total weight of the shaft and a total fiber content of 65% by volume.

The thus obtained golf club shafts were tested for their mechanical properties. Test methods are as follows:

Bending Destruction Test

Sample shaft is inserted through a length of 38 mm from the tip end into a horizontally extending hole of a jig having a shape similar to a head hosel and firmly fixed therein, with the grip end being maintained free. A load is vertically applied at a rate of 5 mm/cm to the shaft at a position 102 mm away from the fixed point until breakage. The load which has caused breakage is measured.

Izod Impact Strength Test

Sample shaft is cut at 60 mm from the tip end thereof. The cut sample is vertically held by firmly nipping the lower half portion thereof. The izod impact strength is measured in accordance with JIS K7110. A hammer whose shaft is swingably supported above the sample is allowed to swing from a predetermined height to hit the sample. The loss of the energy of the hammer caused by the hitting of the sample is measured.

Torque Destruction Test

Sample shaft is firmly gripped at both ends (length: 40 mm) with a pair of jigs. One of the jig on the tip end side is rotated about the axis of the shaft with the other jig being maintained unmoved. The torque which caused breakage of the shaft is measured.

Bending Rigidity Test

Sample shaft is horizontally supported at two positions 15 mm and 180 mm away from the grip end thereof, respectively. A load is then vertically applied at a point 925 mm away from the grip end until that point is lowered through a distance of 165 mm. The load required for lowering the load-applying point through 165 mm is measured. The test is performed at two different positions (0° and 90°) around the circumference of the shaft.

Frequency

Sample shaft is firmly secured at a position 83 mm away from the grip end thereof. A model head weighing 285 g is fixed to the tip end and excited to freely oscillate. The frequency (cycles per minute) is measured using a counter (Precision FM manufactured by Brunswick Inc.). The test is performed at eight different positions (0°, 45°, 90°, 135°, 180°, 225°, 270° and 315°) around the circumference of the shaft.

The test results were as summarized in Table below.

As will be seen from the test results, while the shaft of Comparative Example 1 whose outer layer is formed by the sheet winding method shows good mechanical strengths, the bending characteristics vary with the position around the circumference. On the other hand, the shaft of Comparative Example 2 whose inner layer is formed by the filament winding method shows uniform bending characteristics but the mechanical characteristics are unsatisfactory. Neither the uniformity in bending characteristics nor the mechanical properties of the shaft of Comparative Example 3, in which the hardening of the resin is performed only once after the formation of the wound outer layer, are satisfactory. In contrast, the golf club shaft according the present invention exhibits excellent mechanical strengths while maintaining uniform deflection characteristics around the circumference.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

| Example | 1 | | | |
| --- | --- | --- | --- | --- |
| Comparative Example | | 1 | 2 | 3 |
| Bending Destruction Test (kg) | 41 | 40 | 30 | 35 |
| Izod Impact Strength Test (kg/cm) | 125 | 135 | 120 | 125 |
| Torque Destruction Test (kg/cm) | 178 | 180 | 130 | 165 |
| Bending Rigidity Test (kg) | | | | |
| 0° | 13.5 | 13.8 | 13.2 | 12.5 |
| 90° | 13.6 | 13.2 | 13.2 | 13.2 |
| Frequency (cpm) | | | | |
| 0° | 208.3 | 211.4 | 205.1 | 206.1 |

-continued

| | | | | |
|---|---|---|---|---|
| 45° | 208.8 | 209.5 | 205.2 | 201.9 |
| 90° | 208.5 | 205.3 | 204.9 | 198.2 |
| 135° | 207.2 | 207.2 | 205.1 | 200.7 |
| 180° | 207.6 | 207.3 | 205.4 | 208.4 |
| 225° | 207.9 | 209.5 | 205.4 | 202.5 |
| 270° | 207.6 | 206.1 | 205.1 | 197.8 |
| 315° | 208.1 | 208.8 | 205.5 | 201.4 |

What is claimed is:

1. A golf club shaft having a grip end, a tip end, an outer diameter gradually decreasing from said grip end to said tip end, and an average weight of not greater than 1.4 g per inch, said shaft comprising:

an inner tubular layer formed of a hardened, first carbon fiber-reinforced plastic and extending continuously throughout the length of said shaft, said inner layer containing a first carbon fiber group having a modulus of 29,000 kgf/mm$^2$ or more and a tensile strength of 300 kgf/mm$^2$ or more and oriented at an angle in the range of 40 to 50 degrees with respect to the longitudinal axis of said shaft;

an outer tubular layer provided contiguously around said inner layer throughout the length thereof and formed of a hardened, second carbon fiber-reinforced plastic material, said outer layer containing a second carbon fiber group having a modulus of 24,000 kgf/mm$^2$ or more and a tensile strength of 450 kgf/mm$^2$ or more and oriented at an angle in the range of 5 to 30 degrees with respect to the longitudinal axis of said shaft, and a tubular, reinforcing layer provided inside of said inner layer and extending from said tip end with a length of 50 to 500 mm, said reinforcing layer being formed of a hardened, reinforcing fiber-reinforced plastic containing a fiber group having a modulus of 20,000 kgf/mm$^2$ or more and a tensile strength of 500 kgf/mm$^2$ or more and oriented at an angle in the range of 0 to 5 degrees with respect to the longitudinal axis of said shaft, the weight ratio of said inner layer to said outer layer being in the range of 20:80 to 55:45, the thickness ratio of said inner layer to said outer layer being in the range of 1:3 to 1:1, said inner layer being obtained from a prepreg sheet containing said first carbon fiber groups dispersed within a matrix of a first hardenable resin, said reinforcing layer being obtained from a prepreg sheet containing said reinforcing fiber group dispersed within a matrix of a second hardenable resin, said outer layer being obtained from windings of a roving of said second carbon fiber groups impregnated with a third hardenable resin, said first and second hardenable resins having been hardened before the winding of said roving.

2. A process for the preparation of a golf club shaft, comprising the steps of:

providing an axially elongated mandrel having an outer diameter gradually increasing from one end thereof to the other end thereof;

winding at least one sheet of a first prepreg, containing uniaxially oriented reinforcing fibers each having a modulus of 20,000 kgf/mm$^2$ and a tensile strength of 500 kgf/mm$^2$ or more and dispersed within a matrix of a first hardenable resin, around said mandrel to form a first wound layer axially extending from a first portion of said mandrel adjacent to said one end to a second portion of said mandrel 50–500 mm away from said first portion with said reinforcing fibers being oriented at an angle in the range of 0 to 5 degrees with respect to the axis of said mandrel;

winding at least one sheet of a second prepreg, containing uniaxially oriented first carbon fibers each having a modulus of 29,000 kgf/mm$^2$ or more and a tensile strength of 300 kgf/mm$^2$ or more and dispersed within a matrix of a second hardenable resin, around said mandrel to form a second wound layer axially extending from said first portion of said mandrel to a third portion of said mandrel adjacent to said the other end thereof with said first carbon fibers being oriented at an angle in the range of 40 to 50 degrees with respect to the axis of said mandrel;

then hardening said first and second wound layers so that a reinforcing layer of the hardened first resin reinforced with said reinforcing fibers and an inner layer of the hardened second resin reinforced with said first carbon fibers are formed around said mandrel;

then winding a roving of second carbon fibers each having a modulus of 24,000 kgf/mm$^2$ and a tensile strength of 450 kgf/mm$^2$ or more and impregnated with a third hardenable resin around said inner layer to form a third wound layer extending to entirely cover said inner layer with said second carbon fibers being oriented at an angle in the range of 5 to 30 degrees with respect to the axis of said mandrel;

then hardening said third wound layer to form an outer layer of the hardened third resin reinforced with said second carbon fibers and to thereby form an integral assembly composed of said reinforcing layer, said inner layer and said outer layer; and removing said mandrel from said assembly.

* * * * *